(12) United States Patent
Mangla et al.

(10) Patent No.: US 7,738,887 B2
(45) Date of Patent: Jun. 15, 2010

(54) VOICE INSTANT MESSAGING BETWEEN MOBILE AND COMPUTING DEVICES

(75) Inventors: Sanjay Mangla, Redmond, WA (US); Alpesh R Gaglani, Redmond, WA (US); John R. Selbie, Seattle, WA (US); Kevin Durdle, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 11/273,619

(22) Filed: Nov. 14, 2005

(65) Prior Publication Data

US 2007/0099637 A1    May 3, 2007

Related U.S. Application Data

(60) Provisional application No. 60/732,329, filed on Oct. 31, 2005.

(51) Int. Cl.
    *H04W 4/00*    (2009.01)
(52) U.S. Cl. ...................................... 455/466
(58) Field of Classification Search .................. 455/466
    See application file for complete search history.

(56) References Cited

U.S. PATENT DOCUMENTS

| | | | |
|---|---|---|---|
| 5,867,661 | A | 2/1999 | Bittinger et al. |
| 6,421,683 | B1 | 7/2002 | Lamburt |
| 6,564,261 | B1 | 5/2003 | Gudjonsson et al. |
| 6,578,056 | B1 | 6/2003 | Lamburt |
| 6,654,790 | B2 | 11/2003 | Ogle et al. |
| 6,757,365 | B1 | 6/2004 | Bogard |
| 6,763,226 | B1 | 7/2004 | McZeal, Jr. |
| 6,779,025 | B1 | 8/2004 | Wolfe et al. |
| 7,197,122 | B2 * | 3/2007 | Vuori ....................... 379/88.25 |

(Continued)

FOREIGN PATENT DOCUMENTS

KR         200064041        11/2000

(Continued)

OTHER PUBLICATIONS

Shape Services; IM+ Voice Instant Messenger, retrieved from the Internet Nov. 4, 2005: http://www.shapeservices.com/eng/im/index.php.

(Continued)

*Primary Examiner*—Rafael Pérez-Gutiérrez
*Assistant Examiner*—Yungsang Lau
(74) *Attorney, Agent, or Firm*—Lee & Hayes, PLLC (57) ABSTRACT

Voice instant messaging between mobile and computing devices is described. In an embodiment, a messaging service receives a recorded voice clip from a mobile communication-enabled device via a wireless communication link. The messaging service then processes the recorded voice clip for communication via a data network to a computing-based device that renders an audio message from the recorded voice clip. A virtual connection protocol manages and sequences transmission control protocol (TCP) connection events to provide reliable wireless transfer of recorded voice clip(s) via wireless communication link. The mobile communication-enabled device logs a first instant messaging contact into the messaging service, and the computing-based device logs a second instant messaging contact into the messaging service to enable two-way voice instant messaging between the first instant messaging contact and the second instant messaging contact at the respective devices.

14 Claims, 7 Drawing Sheets

U.S. PATENT DOCUMENTS

| | | |
|---|---|---|
| 7,317,716 B1 * | 1/2008 | Boni et al. .................. 370/352 |
| 7,349,911 B2 | 3/2008 | Kusama et al. |
| 7,545,521 B2 | 6/2009 | Hanamoto et al. |
| 2002/0032027 A1 | 3/2002 | Kirani et al. |
| 2002/0122413 A1 | 9/2002 | Shoemake |
| 2003/0028602 A1 | 2/2003 | Bhattacharya |
| 2003/0093468 A1 | 5/2003 | Gordon et al. |
| 2003/0169860 A1 | 9/2003 | Chou |
| 2004/0015591 A1 | 1/2004 | Wang |
| 2004/0202117 A1 | 10/2004 | Wilson et al. |
| 2004/0240413 A1 | 12/2004 | Kim et al. |
| 2004/0243944 A1 * | 12/2004 | Sabiers et al. ................ 715/853 |
| 2004/0252815 A1 * | 12/2004 | Lennox .................... 379/88.22 |
| 2004/0268239 A1 | 12/2004 | Fujita |
| 2005/0015496 A1 | 1/2005 | Guo et al. |
| 2005/0025150 A1 | 2/2005 | Helmy et al. |
| 2005/0080907 A1 | 4/2005 | Panasyuk et al. |
| 2006/0123047 A1 | 6/2006 | Christensen et al. |
| 2007/0130282 A1 | 6/2007 | Ryan |

FOREIGN PATENT DOCUMENTS

| | | |
|---|---|---|
| WO | WO02073331 | 9/2002 |
| WO | WO2004109472 | 12/2004 |

OTHER PUBLICATIONS

Nokia Teams with Hotsip to Provide Multimedia IP Services, retrieved from the Internet Nov. 4, 2005: http://informationweek.networkingpipeline.com/news/50900170.

Skype, retrieved from the Internet Nov. 4, 2005: http://www.skype.com/products.

Dialpad; Overview, retrieved from the Internet Nov. 4, 2005: http://www.dialpad.com/company.

Krill, "W3C addresses Web services bandwidth", Jan. 25, 2005, http://www.networkworld.com/news/2005/0125w3caddre.html.

"Riverbed Steelhead 1010 accelerates applications dramatically over WANs", http://www.riverbed.com/docs/AnalystReport-Tolly-Riverbed-Summary.pdf.

"Wireless Communications and Windows", Dec. 23, 2002, http://www.microsoft.com/whdc/device/network/wireless/wirelesstech.mspx.

Fallside et al, "SOAP Message Transmission Optimization Mechanism," retrieved on Oct. 24, 2008 at <<http://www.w3.org/TR/2004/PR-soap12-mtom-20041116/>>, W3C, Nov. 16, 2004, 17 pgs.

* cited by examiner

VOICE INSTANT MESSAGING BETWEEN MOBILE AND COMPUTING DEVICES

RELATED APPLICATION

This application claims priority to U.S. Provisional Application Ser. No. 60/732,329 entitled "MTOM Data Transfer via TCP & Voice Instant Messaging between Mobile and Computing Devices" filed Oct. 31, 2005 to Miller et al., the disclosure of which is incorporated by reference herein.

BACKGROUND

Wireless wide area networks (WANs) pose considerable problems to providing efficient and reliable transport connection protocol (TCP) connectivity between a mobile device and an Internet service. A wireless connection can be unreliable and may frequently be lost due to poor wireless reception, lack of wireless coverage, a drained battery (in the mobile device), wireless WAN congestion, and other similar reasons. Additionally, the available bandwidth for a wireless connection is typically low (e.g., 20-30 kbps in 2.5G networks) and latency is typically high (e.g., greater than 700 ms in 2.5G networks).

When a wireless connection is lost while transferring a file or posting a photo from a camera-enabled phone to a blog, for example, the wireless connection needs to be re-established to complete the wireless transfer. In such a case, the wireless transfer needs to be re-started from the beginning after the wireless connection is re-established when the connection is lost. If the wireless connection is then lost multiple times, the wireless transfer has to be started over from the beginning multiple times in order to complete the transfer.

Binary large objects in a Simple Object Access Protocol (SOAP) message can be separated utilizing SOAP Message Transmission Optimization Mechanism (MTOM) which then uses Multi-Purpose Internet Mail Extensions (MIME) to package the XML and binary parts of the SOAP message for transfer. A SOAP message requires base64 encoding and the MIME encoding format allows for the transmission of binary rather than base64 encoded data. With MTOM, the base64 encoded binaries that are part of a SOAP message packet are transmitted separately. The MIME protocol is used to separate and then combine the separate binaries and the SOAP message. However, the MIME encoding format creates large encoded files which transfer slowly and are subject to interruption when a wireless connection is lost.

SUMMARY

This summary is provided to introduce simplified concepts of voice instant messaging between mobile and computing devices which is further described below in the Detailed Description. This summary is not intended to identify essential features of the claimed subject matter, nor is it intended for use in determining the scope of the claimed subject matter.

In an embodiment of voice instant messaging between mobile and computing devices, a messaging service receives a recorded voice clip from a mobile communication-enabled device, such as a cellular phone, via a wireless communication link. The messaging service then processes the recorded voice clip for communication via a data network to a computing-based device that renders an audio message from the recorded voice clip. The mobile communication-enabled device logs a first instant messaging contact into the messaging service, and the computing-based device logs a second instant messaging contact into the messaging service to enable two-way voice instant messaging between the first instant messaging contact and the second instant messaging contact at the respective devices.

In another embodiment of voice instant messaging between mobile and computing devices, A virtual connection protocol manages and sequences binary transport connection(s), such as transmission control protocol (TCP) connection events, to provide reliable wireless transfer of recorded voice clip(s) via the binary transport connection(s) of the wireless communication link. The TCP connection events transfer message units corresponding to a recorded voice clip from a mobile communication-enabled device to a messaging service, and vice-versa.

In an event that a first TCP connection event transfers a subset of the message units to the messaging service before a disconnect occurs that precludes additional message units from being transferred, the mobile communication-enabled device can resume transfer of the additional message units to the messaging service via a second TCP connection event. The messaging service can communicate to the mobile communication-enabled device that the messaging service received the subset of the message units before the disconnect of the first TCP connection event and/or communicate to the mobile communication-enabled device that the messaging service did not receive the additional message units before the disconnect of the first TCP connection event.

BRIEF DESCRIPTION OF THE DRAWINGS

The same numbers are used throughout the drawings to reference like features and components.

DETAILED DESCRIPTION

Voice instant messaging between mobile and computing devices is described in which embodiments provide that a messaging service can implement voice instant messaging between a mobile device and a computing device. A user having a mobile device can log into the messaging service via the mobile device, and a computer user can log into the messaging service via a computing device to enable two-way voice instant messaging between the user with the mobile device and the computer user at the computer. Unlike current voice instant messaging communications which are PC to PC via a point-to-point data network, voice instant messaging between mobile and computing devices enables the user with the mobile device to record a voice clip (e.g., a voice instant message) and communicate the message via a wireless communication link to a messaging service. The messaging service then processes the voice clip and communicates the message via a data network to the computer user where the computing device renders an audio message from the recorded voice clip.

Because it is difficult to type messages on most mobile devices, such as a cellular phone, having the ability to record a spoken message and send the message to a contact at a personal computer greatly enhances the usability of instant messaging communication between PCs and mobile devices. The recipient of a voice instant message can listen to a recorded message, record back a reply, and send it back to the original sender, thus enabling a two-way voice instant messaging conversation. Additionally, voice instant messages are fully recorded and then communicated to a receiving device which does not replay the message until the complete voice instant message is received which ensures good fidelity of the message during playback. This aspect of voice instant messaging is but one difference from other technologies, such as Push-To-Talk, which relies on real-time communication (data transfer) and playback of voice packets, and can result in poor and/or broken audio playbacks when communicated over high latency, low bandwidth wireless communication links.

A virtual connection protocol manages and sequences transmission control protocol (TCP) connection events to provide reliable wireless transfer of recorded voice clip(s) via the TCP connection(s) of a wireless communication link. The virtual connection maintains a connection state over the sequential TCP connection(s) and transfers message units corresponding to a recorded voice clip between a mobile communication-enabled device and a messaging service.

While aspects of the described systems and methods for voice instant messaging between mobile and computing devices can be implemented in any number of different computing systems, environments, messaging systems, and/or configurations, embodiments of voice instant messaging between mobile and computing devices are described in the context of the following exemplary system architecture(s).

Figure 1:
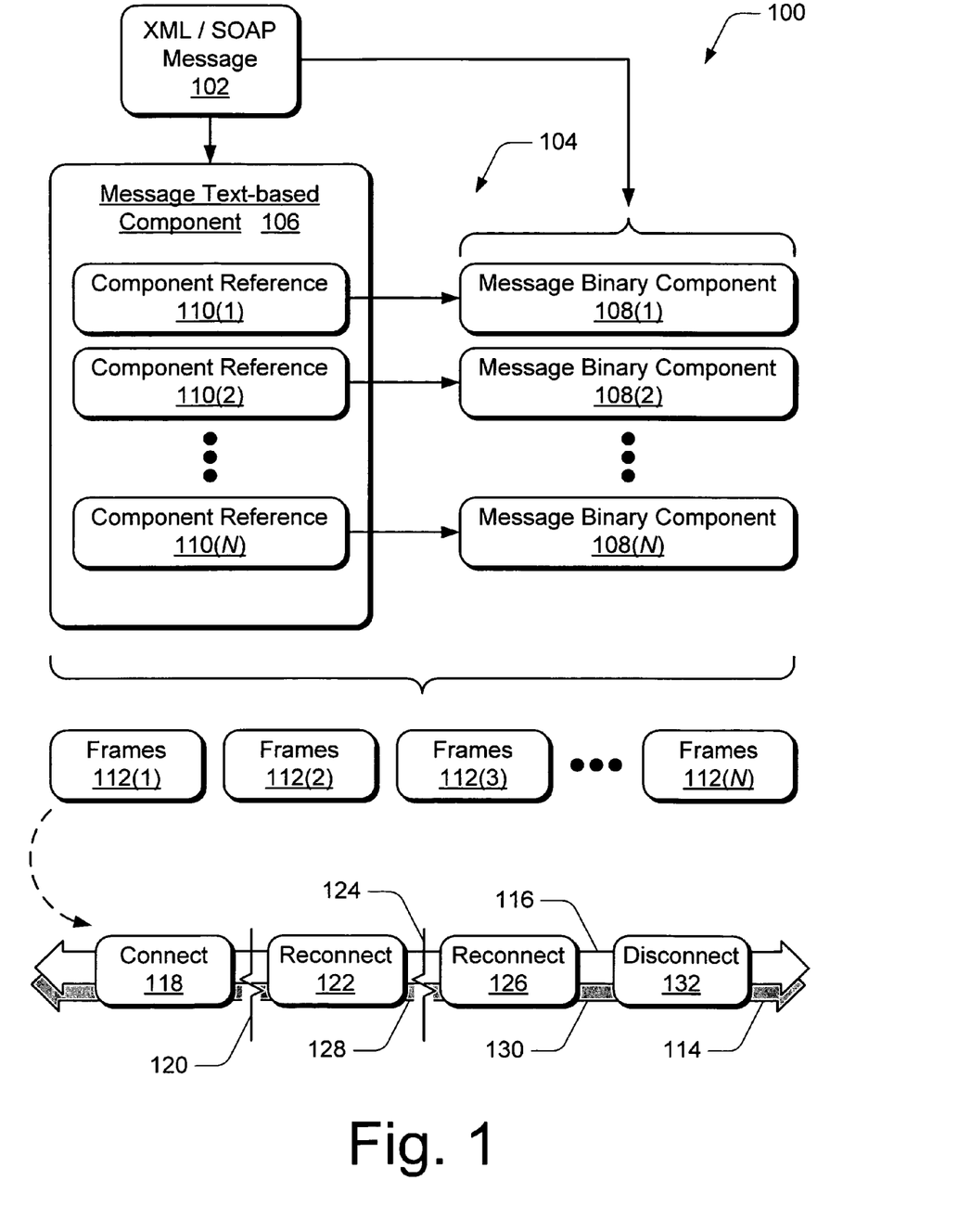
FIG. 1 illustrates an exemplary data transfer system in which embodiments of MTOM data transfer via TCP and/or voice instant messaging between mobile and computing devices can be implemented.

FIG. 1 illustrates an exemplary data transfer system 100 in which embodiments of MTOM data transfer via TCP and/or voice instant messaging between mobile and computing devices can be implemented. The system 100 includes an XML or Simple Object Access Protocol (SOAP) message 102 that is separated into message units 104 that include a text-based component 106 and any number of independent binary components 108(1-N) of the message 102. The SOAP message 102 can be separated into the message units 104 utilizing SOAP Message Transmission Optimization Mechanism (MTOM).

In an embodiment, a transmission control protocol (TCP) binding is utilized to package the XML and binary parts of the XML or SOAP message, rather than using the Multi-Purpose Internet Mail Extensions (MIME) encoding format that is typically used with MTOM. The TCP binding efficiently breaks MTOM packages into multiple packets and provides reliable delivery of these packets over multiple sequential TCP connections. It is more efficient to transmit a message as binary message units 104 rather than using MIME which does not allow for resumption of a partially transmitted MIME package. As such, MTOM data transfer via TCP is useful when transferring data in an unreliable, constrained bandwidth, and/or high latency transmission environment, and in an embodiment, is applicable for transmissions with mobile devices.

The message text-based component 106 includes references 110(1-N) to each of the respective independent message binary components 108(1-N). The message units 104 are communicated as a series of frames 112(1-N) that represent the message text-based component 106 and the independent binary component(s) 108(1-N) of the XML or SOAP message 102. The TCP binding breaks the MTOM parts (e.g., the message units 104) into the one or more frames 112(1-N) and each frame 112(1-N) can be transmitted in a separate data packet.

A data packet can include any one or more of the following fields, as well as any other information and data corresponding to the message units 104 of the SOAP message 102:

| | |
|---|---|
| Version | A version number identifies a protocol version. |
| Command | A binding command (several are discussed below). |
| Message No. | A message number identifies the packet number. |
| Sequence No. | A sequence number identifies a packet sequence number. |
| Payload Length | Identifies a length of the payload field. |
| MP Flag | Identifies whether more message packets are outstanding. |
| MF Flag | Identifies whether more frames of a part are outstanding. |
| Next Header | Identifies a next extension header of the packet. |
| Payload | Included data (e.g., a frame 112). |

In various embodiments, the XML or SOAP message 102 may be a recorded voice clip for voice instant messaging between a mobile communication-enabled device and a computing-based device or another mobile communication-enabled device. Additionally, the XML or SOAP message 102 may be an email message communicated to a mobile phone, where the email includes a photo as an attachment, or the XML or SOAP message 102 may be a picture captured with a camera phone that is then posted to a blog.

The message units 104 are communicated from a sending device to a mobile communication-enabled receiving device, for example, via a TCP connection 114 of binary transport connection event(s) that are sequenced and managed by a virtual connection protocol 116. A connect command 118 establishes the virtual connection 116 which maintains a connection state over multiple sequential TCP connections. The TCP connection 114 may be unreliable and disconnect at 120. The underlying TCP connection 114 is shown to have disconnected at 120, while the virtual connection 116 is maintained. A reconnect command 122 of the virtual connection 116 maintains communication of the message units (e.g., the frames 112(1-N)) from one device to another when the TCP connection 114 is lost and then reconnected. Similarly, the TCP connection may be lost at 124 and another reconnect command 126 of the virtual connection 116 maintains the communication between devices to provide reliable wireless transfer of the message units 104 via binary transport connection event(s) that make up the TCP connection 114.

When the connect 118 of the virtual connection 116 is established, the frames 112(1-N) corresponding to the message units 104 are communicated via the TCP connection event(s) 114. In an event that a first binary transport connection event 128 transfers a subset of the message units (e.g., only frames 112(1-2)) to a receiving device before disconnect 124 precludes additional message units (e.g., frames 112(3-N)) from being transferred, the sending device can resume transfer of the additional message units to the receiving device via a second binary transport connection event 130. When a wireless connection is re-established after the connection is lost, for example, the wireless transfer of the message units 104 does not need to be re-started from the beginning.

In an embodiment, the receiving device can communicate to the sending device that the receiving device received the subset of the message units and/or did not receive the additional message units before the disconnect 124 of the first binary transport connection event 128. The sending device then knows which frames 112 have been received and which have not, and can then resume transfer of just the additional frames without having to start a communication of all the frames 112(1-N) over again. When all of the message units 104 corresponding to the XML or SOAP message 102 are received at the receiving device, the message text-based component 106 and the independent binary component(s) 108(1-N) can be combined to form the XML or SOAP message. An optional disconnect command 132 serves as an indicator that the frames 112(1-N) have all been transferred and the virtual connection 116 is relinquished.

The binding commands, such as connect 118, reconnect 122, and disconnect 132, are used to manage the virtual connection 116 and transfer XML or SOAP messages via the virtual connection. Virtual connection management and responses are described with reference to FIGS. 5-6. Other binding commands for a virtual connection can include any one or more of the following commands:

| Virtual Connection Management | |
|---|---|
| Null | A null packet may be used to sequence a message state, and can include an extension header. |
| Connect | Sets up a virtual connection with a proxy server, and the virtual connection may be authenticated. |
| Reconnect | Reestablish a virtual connection with the proxy server. |
| Disconnect | Tear down a virtual connection with the proxy server. |
| Idle | An idle packet is used to reset the client and proxy server idle time for a virtual connection. |
| Message | Transfer a frame of a SOAP message over the virtual connection (once connected). |
| Responses | |
| Connect Response | Proxy server response to a connect command. |
| Reconnect Response | Proxy server response to a reconnect command. |
| Disconnect Response | Proxy server response to a disconnect command. |
| Idle Response | Proxy server response to a idle command. |
| Error | Error response to any command for SOAP over TCP binding errors. SOAP faults can be transferred as part of a SOAP message using the message command. |

Extension headers may be included in the payload of a data packet and can be used to convey a state of a virtual connection between two devices, such as a mobile communication-enabled device and a server device. The extension headers for a virtual connection 116 can include any one or more of the following:

| | |
|---|---|
| No Data | Indicates that there is no data in a payload. |
| Authenticate | Authentication data includes a token (e.g., issued by a secure token service), the nounce generated by a mobile client, and a hash of the nounce using the key associated with the token. |
| Virtual Connection | Virtual connection data includes the VCID (virtual connection ID) and the DID (device ID) |
| Sequence | Sequence data used to control the flow of packets from a sending device to a receiving device. * |
| Idle (Keep Alive) | Idle data is used to control the time the sending device intends to hold the TCP connection open idle. |
| SOAP Part | SOAP message part data indicates that the payload contains a frame of a SOAP part of a SOAP message. The header indicates if the SOAP part is compressed and the type of compression used. |
| BLOB Part | BLOB (binary large object) message part data indicates that the payload contains a frame of a BLOB part of a SOAP message. The header contains a content ID of the BLOB part, and indicates if the part is compressed and the type of compression used. |
| Error | Error data contains the error code of the packet indicated by the negative acknowledgement number that the receiving device failed to process. |
| Data | The data in a payload. |

* Sequence Extension Header: TCP does not guarantee delivery of packets, but rather only error free delivery and that the packets will be delivered in order. Consequently, buffered packets may be lost if the TCP connection is terminated through a dropped connection. The sequence extension header in the reconnect command and an associated response allows both the proxy server and client device to detect lost packets and provides a restart capability to resume a data transfer.

Figure 2:
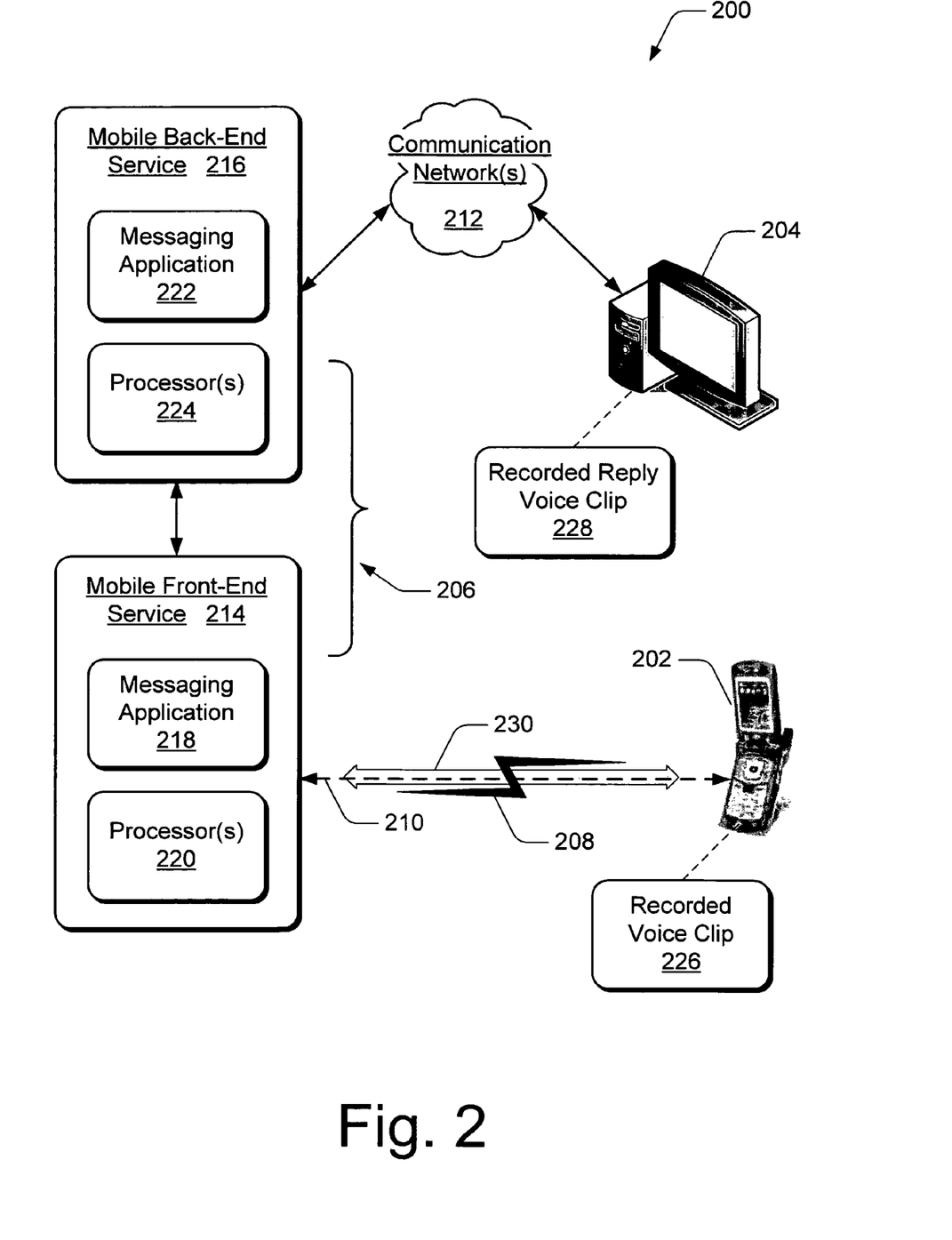
FIG. 2 illustrates an exemplary messaging system in which embodiments of MTOM data transfer via TCP and/or voice instant messaging between mobile and computing devices can be implemented.

FIG. 2 illustrates an exemplary messaging system 200 in which embodiments of voice instant messaging between mobile and computing devices and/or MTOM data transfer via TCP can be implemented. The messaging system 200 includes a mobile communication-enabled device 202, a computing-based device 204, and a messaging service 206. The messaging system 200 can also include any number of other messaging-enabled devices besides the mobile communication-enabled device 202 and the computing-based device 204. The messaging devices 202 and 204 are each configured for communication with the messaging service 206 via any one or more communication network(s). Additionally, the messaging service 206 and/or the messaging devices 202 and 204 can be implemented with any one or combination of the components as described with reference to the exemplary computing and/or messaging device 700 shown in FIG. 7.

In this example, the mobile device 202 is a cellular phone configured for wireless communication 208 with the messaging service 206 via a wireless communication link 210, such as a cellular communication network. The computing-based device 204 is a computer configured for data network communication with the messaging service 206 via communication network(s) 212. The mobile communication-enabled device 202 can log a first instant messaging contact into the messaging service 206, and the computing-based device 204 can log a second instant messaging contact into the messaging service 206 to enable two-way voice instant messaging between the first instant messaging contact and the second instant messaging contact at the respective devices.

In alternate examples, either one or both of the messaging devices 202 and 204 may be implemented in any number of embodiments to include a computing device, a mobile messaging device, an appliance device, a gaming system console, an entertainment system component, a cell phone and/or combination PDA (personal digital assistant), and as any other type of messaging device that may be implemented in a messaging system. The messaging devices 202 and 204 can also represent logical clients that may include a user at a messaging device 202 and/or 204, other devices, and/or software applications that implement embodiments of voice instant messaging between mobile and computing devices.

The communication network(s) 212 can be implemented as any one or combination of a wide area network (WAN), a local area network (LAN), a wireless network, a public telephone network, an intranet, the Internet, a point-to-point communication link, and the like. Although shown as a single communication network, the network(s) 212 can be implemented using any type of network topology and any network communication protocol, and can be represented or otherwise implemented as a combination of two or more networks. A digital network can include various hardwired and/or wireless links, routers, gateways, and so on to facilitate communication between the messaging service 206 and the computing-based system 204.

In this example, the messaging service 206 includes a mobile front-end service 214 and a mobile back-end service 216. The mobile front-end service 214 includes a messaging application 218 and one or more processors 220 (e.g., any of microprocessors, controllers, and the like). Similarly, the mobile back-end service 216 includes a messaging application 222 and one or more processors 224. The processors 220 and 224 process various computer executable instructions to control the operation of the respective mobile services 214 and 216, to communicate with other electronic and computing devices, and to implement embodiments of voice instant messaging between mobile and computing devices. Additionally, each of the messaging applications 218 and 222 are executable on a respective processor 220 and 224 to implement embodiments of MTOM data transfer via TCP and/or voice instant messaging between mobile and computing devices.

The messaging service 206 may also include a messaging manager (not shown) which can be implemented to facilitate communication between the mobile front-end service 214 and the mobile back-end service 216, and to facilitate voice instant messaging between the mobile communication-enabled device 202 and the computing-based device 204.

In this example, a user of the mobile communication-enabled device 202 can record a voice clip 226 (also referred to as a "voice instant message") which is communicated to the mobile front-end service 214 via the wireless communication link 210. The mobile front-end service 214 receives the recorded voice clip 226 from the mobile communication-enabled device 202 and assembles the voice instant message for transfer to the mobile back-end service 216. The mobile back-end service 216 processes the voice instant message for data network communication via the communication network(s) 212 to the computing-based device 204 that renders an audio message from the recorded voice clip 226.

Similarly, a user at the computing-based device 204 can receive the message of the recorded voice clip 226 and respond with a recorded reply voice clip 228 that is communicated to the mobile back-end service 216 via the communication network(s) 212. The mobile back-end service 216 transfers the reply voice instant message to the mobile front-end service 214 which processes the reply voice instant message for wireless communication via the wireless communication link 210 to the mobile communication-enabled device 202 that renders a reply audio message from the recorded reply voice clip 228.

As described above with reference to the exemplary data transfer system 100 and MTOM data transfer via TCP, the mobile front-end service 214 and/or the mobile communication-enabled device 202 can initiate and establish a virtual connection 230, such as virtual connection 116 described with reference to FIG. 1. In this example, the mobile device 202 establishes a TCP connection and provides a client identifier to the messaging service 206 which authenticates the client identifier and provides a virtual connection identifier. The virtual connection 230 then manages the underlying wireless connection 210 to provide reliable wireless communication for voice instant messaging between the mobile communication-enabled device 202 and the mobile front-end service 214 of the messaging service 206.

In alternate embodiment(s), the messaging system 200 can be implemented to facilitate voice instant messaging between two or more mobile devices, such as between two or more cellular phones. For example, the recorded voice clip 226 can be recorded at mobile device 202 and communicated to the mobile front-end service 214 via the wireless communication link 210. The messaging service can then process the voice instant message for communication to one or more additional mobile communication-enabled devices, to include exchanging the voice instant message in a multi-party conversation.

Methods for MTOM data transfer via TCP and/or voice instant messaging between mobile and computing devices, such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
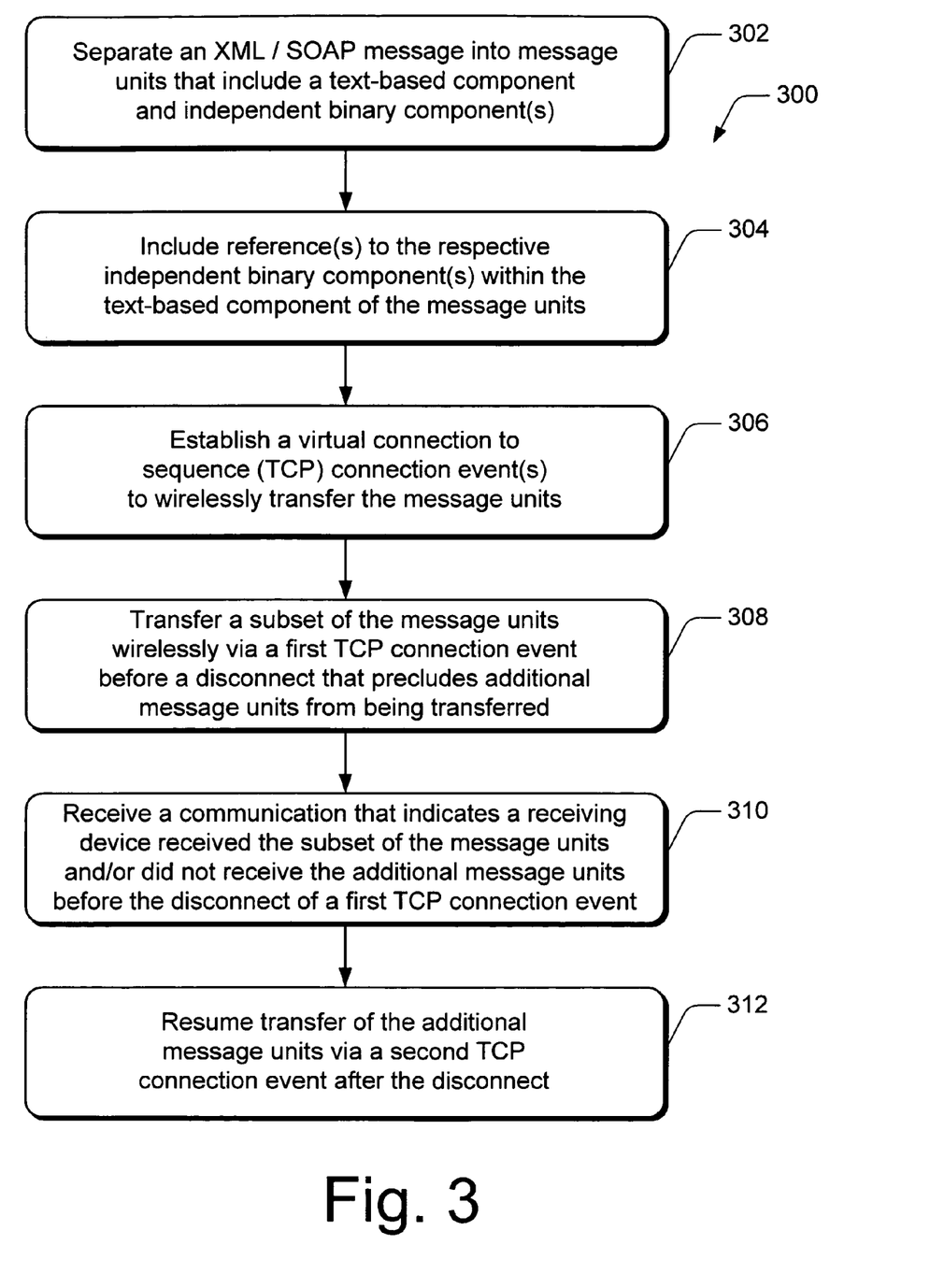
FIG. 3 illustrates exemplary method(s) for MTOM data transfer via TCP.

FIG. 3 illustrates an exemplary method 300 for MTOM data transfer via TCP. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, an XML message that includes text and binary object(s) is separated into message units that include a text-based component and respective independent binary component(s) of the SOAP message. The XML message can be a Simple Object Access Protocol (SOAP) message which can be separated using SOAP Message Transmission Optimization Mechanism (MTOM). For example, the XML or SOAP message 102 (FIG. 1) is separated into message units 104 that include a text-based component 106 and independent binary component(s) 108(1-N) of the message. The message units 104 can be a series of frames 112(1-N) that represent the text-based component 106 and the independent binary component(s) 108(1-N) of the message. The frames 112(1-N) are wirelessly transferred via TCP connection event(s) 114 of a wireless connection.

At block 304, a reference to the independent binary component(s) is included within the text-based component of the message units. For example, the message text-based component 106 includes component references 110(1-N) to each of the respective message binary components 108(1-N).

At block 306, a virtual connection is established to sequence transmission control protocol (TCP) connection event(s) to wirelessly transfer the message units. The message units can then be transferred as binary data via the sequential TCP connection event(s). For example, the virtual connection 116 can be established to sequence the TCP connection events, such as connections 128 and 130 of the TCP connection 114.

At block 308, a subset of the message units are transferred wirelessly via a first TCP connection event before a disconnect that precludes additional message units from being transferred. At block 310, a communication is received that indicates a receiving device received the subset of the message units and/or did not receive the additional message units before the disconnect of a first TCP connection event. At block 312, transfer of the additional message units is resumed via a second TCP connection event after the disconnect such that the receiving device can form the XML or SOAP message from the subset of the message units and the additional message units. For example, a first binary transport connection event 128 transfers a subset of the message units (e.g., only frames 112(1-2)) to a receiving device before disconnect 124 precludes additional message units (e.g., frames 112(3-N)) from being transferred. A sending device can resume transfer of the additional message units (e.g., frames 112(3-N)) to the receiving device via a second binary transport connection event 130.

Figure 4:
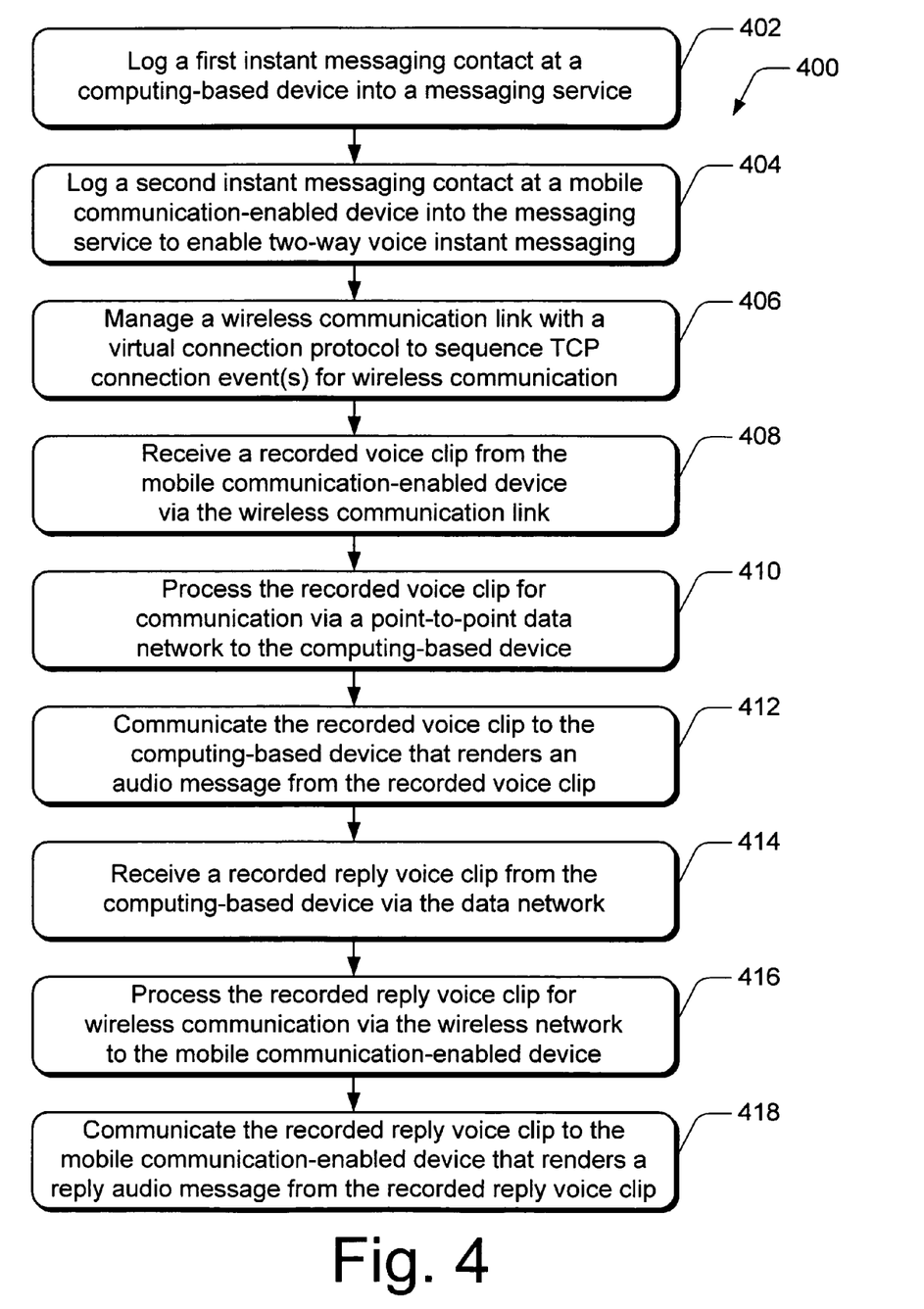
FIG. 4 illustrates exemplary method(s) for voice instant messaging between mobile and computing devices.

FIG. 4 illustrates an exemplary method 400 for voice instant messaging between mobile and computing devices. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, a first instant messaging contact at a computing-based device is logged into a messaging service. For example, a user at the computing-based device 204 (FIG. 2) is logged into the messaging service 206. At block 404, a second instant messaging contact at a mobile communication-enabled device is logged into the messaging service. This enables two-way voice instant messaging between the first instant messaging contact and the second instant messaging contact at the respective devices. For example, a user of the mobile, cellular phone 202 is logged into the messaging service 206.

At block 406, a wireless communication link is managed with a virtual connection protocol to sequence transmission control protocol (TCP) connection event(s) for wireless communication. For example, the virtual connection 230 is established to manage wireless communications 208 via the wireless communication link 210 between the mobile communication-enabled device 202 and the mobile front-end service 214 of the messaging service 206.

At block 408, a recorded voice clip is received from the mobile communication-enabled device via the wireless communication link. For example, a user of the mobile communication-enabled device 202 records voice clip 226 which is communicated to the mobile front-end service 214 via the wireless communication link 210. The mobile front-end service 214 can receive the recorded voice clip 226 as segmented message units corresponding to the recorded voice clip via TCP connection event(s) of the wireless communication.

At block 410, the recorded voice clip is processed for communication via a point-to-point data network to the computing-based device. At block 412, the recorded voice clip is communicated to the computing-based device that renders an audio message from the recorded voice clip. For example, the mobile front-end service 214 receives the recorded voice clip 226 from the mobile communication-enabled device 202 and assembles the voice instant message for transfer to the mobile back-end service 216. The mobile back-end service 216 processes the voice instant message for data network communication via the communication network(s) 212 to the computing-based device 204 that renders an audio message from the recorded voice clip 226.

At block 414, a recorded reply voice clip is received from the computing-based device via the data network. For example, the recorded reply voice clip 228 is recorded at the computing-based device 204 and is communicated to the mobile back-end service 216 via the communication network(s) 212.

At block 416, the recorded reply voice clip is processed for wireless communication via the wireless network to the mobile communication-enabled device. At block 418, the recorded reply voice clip is communicated to the mobile communication-enabled device that renders a reply audio message from the recorded reply voice clip. For example, the mobile back-end service 216 transfers the reply voice instant message to the mobile front-end service 214 which processes the reply voice instant message for wireless communication via the wireless communication link 210 to the mobile communication-enabled device 202 that renders a reply audio message from the recorded reply voice clip 228.

Figure 5:
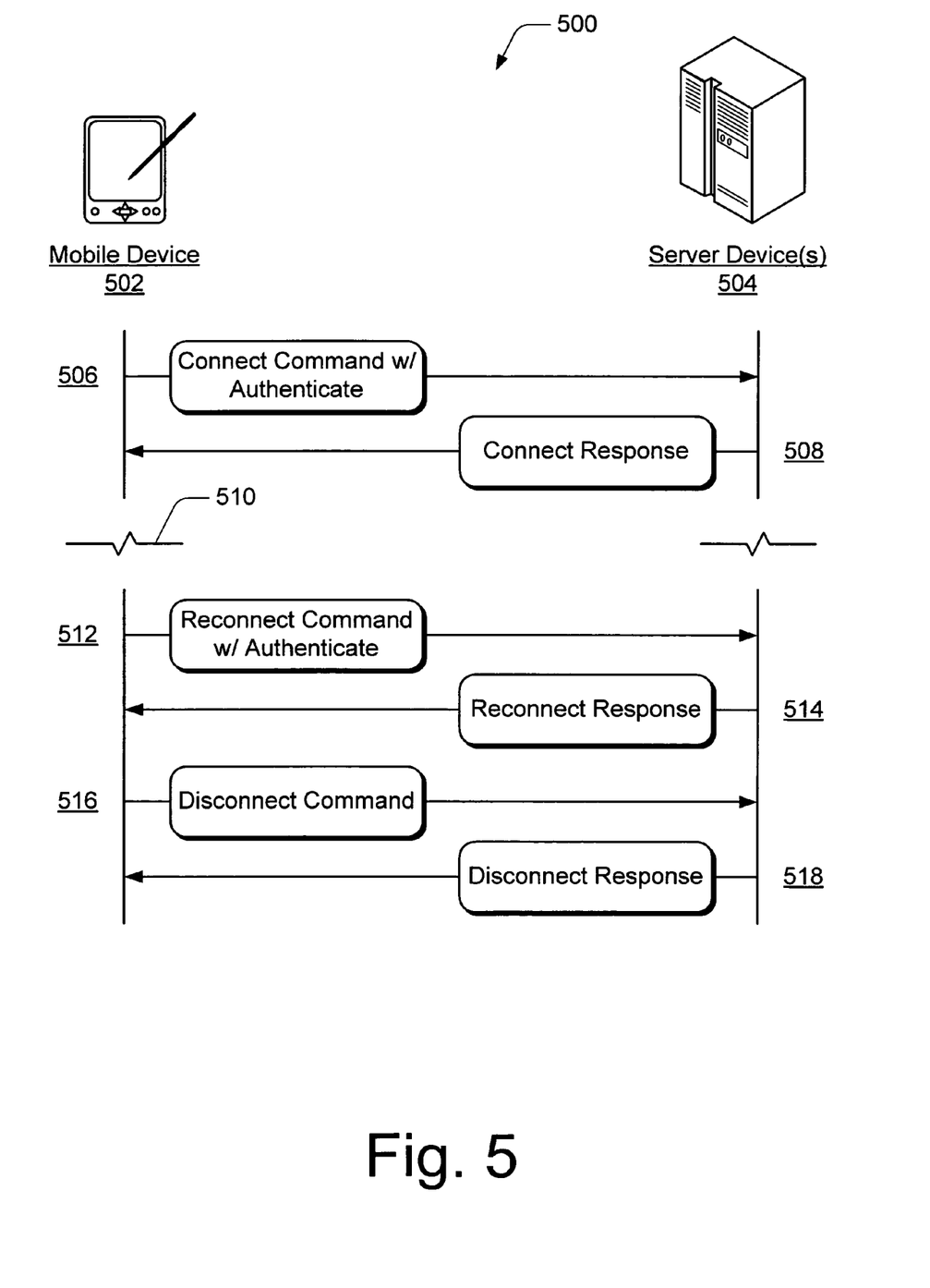
FIG. 5 illustrates an exemplary virtual connection that can be implemented in an embodiment of MTOM data transfer via TCP and/or voice instant messaging between mobile and computing devices.

FIG. 5 illustrates an exemplary virtual connection 500 that can be implemented in an embodiment of MTOM data transfer via TCP and/or voice instant messaging between a mobile communication-enabled device 502 and computing-based device(s), such as server device(s) 504. At 506, the mobile device 502 initiates a connect command with authentication and at 508, the server device 504 responds with a connect response. The connect command sets up a virtual connection with the server device(s) 504 and the command may include a token issued by a secure token service that authenticates the user with the server and a device identifier. The connect response at 508 contains a virtual connection identifier and the device identifier.

When the TCP connection is lost at 510, for example, the mobile device 502 initiates a reconnect command at 512 and at 514, a server device 504 responds with a reconnect response. The reconnect command at 512 reestablishes an existing virtual connection with the server device 504, and may include a token issued by a secure token service that authenticates the mobile device 502 with the server device 504. The reconnect response at 514 contains the virtual connection identifier.

The mobile device 502 can initiate a disconnect command at 516 and at 518, the server device 504 responds with a disconnect response. The disconnect command tears down the virtual connection with the server device 504, and may include a token issued by a secure token service that authenticates the mobile device 502 with the server device 504. The disconnect response at 518 contains the virtual connection identifier.

Figure 6:
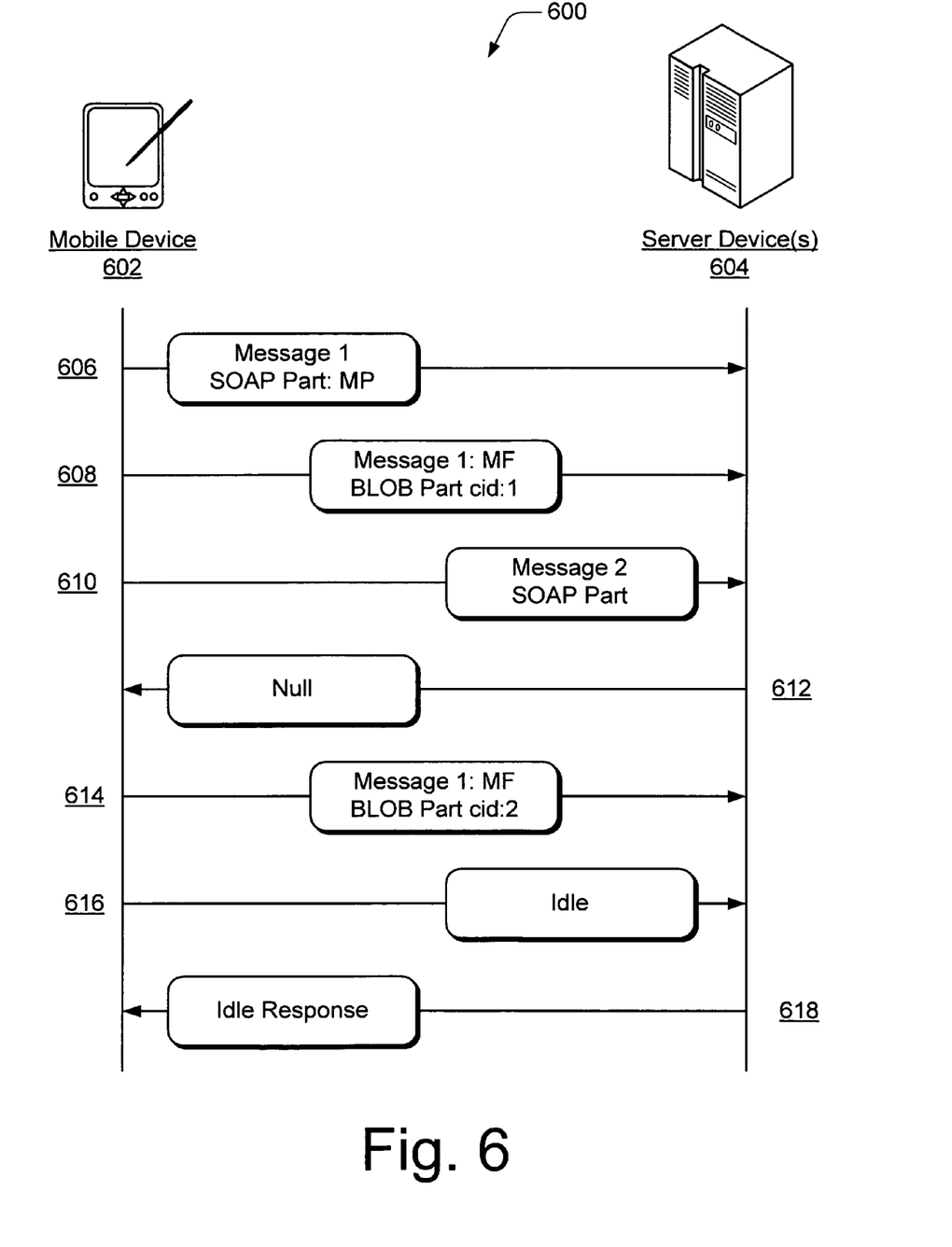
FIG. 6 illustrates exemplary message communication that can be implemented in an embodiment of MTOM data transfer via TCP and/or voice instant messaging between mobile and computing devices.

FIG. 6 illustrates exemplary message communication 600 that can be implemented in an embodiment of MTOM data transfer via TCP and/or voice instant messaging between a mobile communication-enabled device 602 and computing-based device(s), such as server device(s) 604. At 606, the mobile device 602 communicates a message unit with a message command which is used to transfer SOAP message frames between end points of a virtual connection. The message unit at 606 is a SOAP part (e.g., text component) of a first message and indicates that more packets of the first message (e.g., "MP") will follow.

At 608, the mobile device 602 communicates a second message unit of the first message which is a BLOB part (e.g., binary part) of the first message and indicates that more frames of the part (e.g., "MF") will follow. At 610, the mobile device 602 communicates a third message unit which is a SOAP part (e.g., text component) of a second message. The third message unit is complete and there are no message parts to follow. In this example, the second message (at 610) is interleaved with message units of the first message.

At 612, a server device 604 communicates a null command to the mobile device 602. At 614, the mobile device 602 communicates a third message unit of the first message which is a BLOB part (e.g., binary part) of the first message. At 616, the mobile device 602 communicates an idle command to the server device 504 and at 618, the server device 604 communicates an idle response to the mobile device 602.

Figure 7:
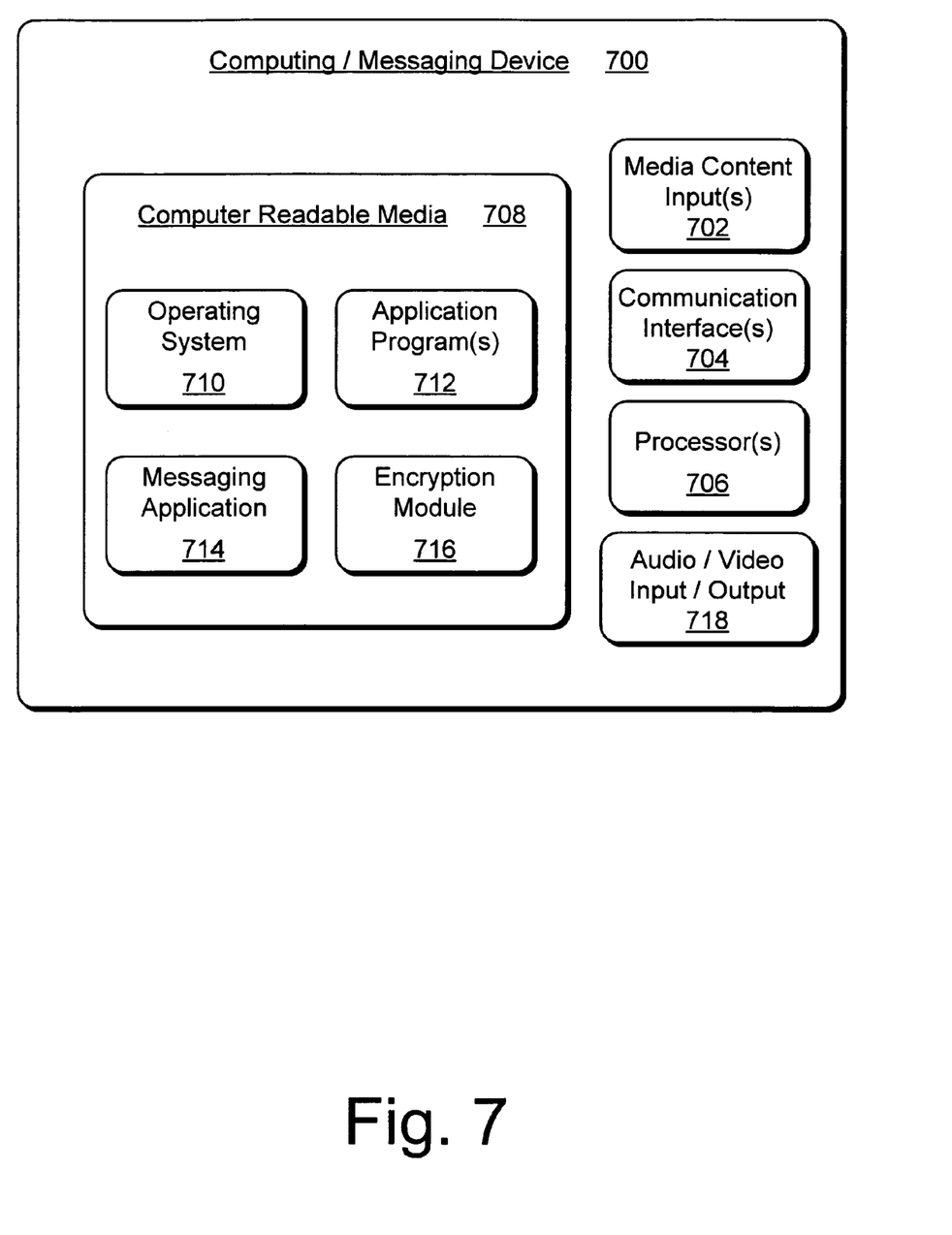
FIG. 7 illustrates various components of an exemplary computing and/or messaging device in which embodiments of MTOM data transfer via TCP and/or voice instant messaging between mobile and computing devices can be implemented.

FIG. 7 illustrates various components of an exemplary computing and/or messaging device 700 which can be implemented as any form of a computing, electronic, and/or messaging device, and in which embodiments of MTOM data transfer via TCP and/or voice instant messaging between mobile and computing devices can be implemented. For example, the device 700 can be implemented as any one or more of the messaging devices or messaging service shown in FIG. 2 as part of the messaging system 200.

Computing and/or messaging device 700 includes one or more media content inputs 702 which may include Internet Protocol (IP) inputs over which streams of media content are received via an IP-based network, an intranet, or the Internet. Device 700 further includes communication interface(s) 704 which can be implemented as any one or more of a serial and/or parallel interface, a wireless interface, any type of network interface, a modem, and as any other type of communication interface. A wireless interface enables device 700 to receive control input commands and other information from an input device, such as from remote control device, PDA (personal digital assistant), cellular phone, or from another infrared (IR), 802.11, Bluetooth, or similar RF input device.

A network interface provides a connection between the computing and/or messaging device 700 and a communication network (e.g., communication network(s) 212 shown in FIG. 2) by which other electronic, computing, and messaging devices can communicate data with device 700. Similarly, a serial and/or parallel interface provides for data communication directly between device 700 and the other electronic, computing, and/or messaging devices. A modem facilitates device 700 communication with other electronic and computing devices via a conventional telephone line, a DSL connection, cable, and/or other type of connection.

Computing and/or messaging device 700 also includes one or more processors 706 (e.g., any of microprocessors, controllers, and the like) which process various computer executable instructions to control the operation of device 700, to communicate with other electronic and computing devices, and to implement embodiments of MTOM data transfer via TCP and/or voice instant messaging between mobile and computing devices. Device 700 can be implemented with computer readable media 708, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 708 provides data storage mechanisms to store various information and/or data such as software applications and any other types of information and data related to operational aspects of the computing and/or messaging device 700. For example, an operating system 710 and/or other application programs 712 can be maintained as software applications with the computer readable media 708 and executed on processor(s) 706 to implement embodiments of MTOM data transfer via TCP and/or voice instant messaging between mobile and computing devices. For example, when implemented as a messaging device (e.g., any of messaging devices 202 and 204, and messaging service 206), computer readable media 708 maintains a messaging application 714 and an encryption module 716 to implement embodiments of MTOM data transfer via TCP and/or voice instant messaging between mobile and computing devices.

The computing and/or messaging device 700 also includes an audio and/or video output 718 that provides audio and video to an audio rendering and/or display system that may be external or integrated with device 700, or to other devices that process, display, and/or otherwise render audio, video, and display data. Video signals and audio signals can be communicated from device 700 to a display device via an RF (radio frequency) link, S-video link, composite video link, component video link, analog audio connection, or other similar communication link. Although not shown, a user can interface with the device 700 via any number of different input devices such as a keyboard and pointing device (e.g., a "mouse"). Other input devices may include a microphone, joystick, game pad, controller, serial port, scanner, keypad, and/or any other type of input device that facilitates instant messaging.

Although embodiments of voice instant messaging between mobile and computing devices have been described in language specific to structural features and/or methods, it is to be understood that the subject of the appended claims is not necessarily limited to the specific features or methods described. Rather, the specific features and methods are disclosed as exemplary implementations of voice instant messaging between mobile and computing devices.

The invention claimed is:

1. A messaging system comprising:
   a processor;
   a wireless communication link coupled to the processor and configured to enable mobile device communication, wherein the wireless communication link is managed by a virtual connection protocol configured to manage and sequence a plurality of transmission control protocol (TCP) connection events; and
   a messaging service operated by the processor and configured to:
      receive a recorded voice clip from a mobile communication enabled device, the recorded voice clip being received via the wireless communication link, wherein the recorded voice clip is a Simple Object Access Protocol (SOAP) message that is separated into a plurality of text-based components and a plurality of independent binary components, each binary component being references by one of the text-based components, one of the text-based components and one of the binary components each having been transmitted as a separate packet without the use of Multipurpose Internet Mail Extensions (MIME); and
      process the recorded voice clip for communication via a data network to a computing based device that renders an audio message from the recorded voice clip.

2. A messaging system as recited in claim 1, wherein the mobile communication enabled device is configured to log a first instant messaging contact into the messaging service, and wherein the computing based device is configured to log a second instant messaging contact into the messaging service to enable two-way voice instant messaging between the first instant messaging contact and the second instant messaging contact.

3. A messaging system as recited in claim 1, wherein the messaging service is further configured to process the recorded voice clip for point to point data network communication to the computing based device.

4. A messaging system as recited in claim 1, wherein the wireless communication link is over a cellular network and the mobile communication enabled device is a cellular phone, and wherein the virtual connection protocol enables segmenting the recorded voice clip for communication.

5. A messaging system as recited in claim 1, wherein the messaging service is further configured to:
receive a recorded reply voice clip from the computing based device via the data network; and
process the recorded reply voice clip for wireless communication to the mobile communication enabled device that renders a reply audio message from the recorded reply voice clip.

6. A messaging system as recited in claim 5, wherein the messaging service is further configured to initiate the virtual connection protocol to sequence the transmission control protocol (TCP) connection events to wirelessly communicate the recorded reply voice clip to the mobile communication enabled device.

7. A messaging system as recited in claim 1, wherein the computing based device is an additional mobile communication enabled device, and wherein the messaging service is an Internet based system coupled via the data network, the messaging service being further configured to enable two-way voice instant messaging between the mobile communication enable device and the additional mobile communication enabled device.

8. A computer-implemented method comprising:
managing a wireless communication link with a virtual connection protocol configured to manage and sequence a plurality of transmission control protocol (TCP) connection events for wireless communication;
receiving a recorded voice clip from a mobile communication enabled device via the wireless communication link, wherein the recorded voice clip is a Simple Object Access Protocol (SOAP) message that is separated into a plurality of text-based components and a plurality of independent binary components, each binary component being references by one of the text-based components, one of the text-based components and one of the binary components each having been transmitted as a separate packet without the use of Multi-purpose Internet Mail Extensions (MIME);
processing the recorded voice clip for communication via a data network to a computing based device that renders an audio message from the recorded voice clip
logging a first instant messaging contact at the computing based device into a messaging service; and
logging a second instant messaging contact at the mobile communication enabled device into the messaging service to enable two-way voice instant messaging between the first instant messaging contact and the second instant messaging contact.

9. A method as recited in claim 8, further comprising communicating the recorded voice clip to the computing based device via a point to point data network.

10. A method as recited in claim 8, further comprising communicating the recorded voice clip to the computing-based device that renders the audio message after receiving all data corresponding to the recorded voice clip.

11. A method as recited in claim 8, further comprising:
receiving a recorded reply voice clip from the computing-based device via the data network; and
processing the recorded reply voice clip for wireless communication to the mobile communication-enabled device that renders a reply audio message from the recorded reply voice clip.

12. One or more computer readable media comprising computer executable instructions that, when executed, direct a computing based messaging service to:
receive a recorded voice clip from a mobile communication enabled device via a wireless communication link that is managed by a virtual connection protocol configured to manage and sequence a plurality of transmission control protocol (TCP) connection events, wherein the recorded voice clip is a Simple Object Access Protocol (SOAP) message that is separated into a plurality of text-based components and a plurality of independent binary components, each binary component being referenced by one of the text-based components, one of the text-based components and one of the binary components each having been transmitted as a separate packet without the use of Multi-purpose Internet Mail Extensions (MIME); and
process the recorded voice clip for communication via a data network to a computing based device that renders an audio message from the recorded voice clip.

13. One or more computer readable media as recited in claim 12, further comprising computer executable instructions that, when executed, direct the computing based messaging service to:
log a first instant messaging contact at the computing based device into the messaging service; and
log a second instant messaging contact at the mobile communication enabled device into the messaging service to enable two-way voice instant messaging between the first instant messaging contact and the second instant messaging contact.

14. One or more computer readable media as recited in claim 12, further comprising computer executable instructions that, when executed, direct the computing based messaging service to:
receive a recorded reply voice clip from the computing based device via the data network; and
process the recorded reply voice clip for wireless communication to the mobile communication enabled device that renders a reply audio message from the recorded reply voice clip.

* * * * *